UNITED STATES PATENT OFFICE.

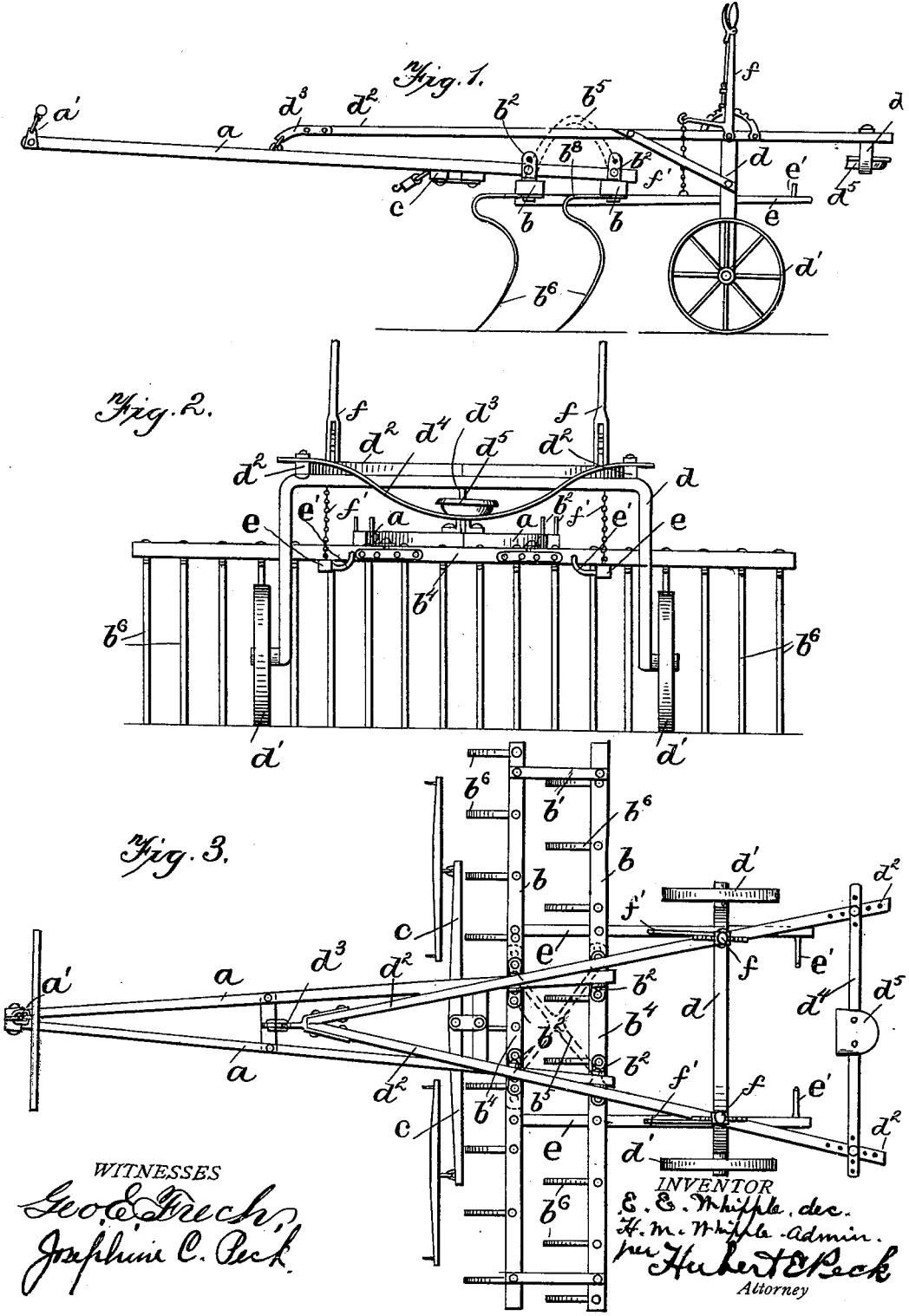

HANNAH M. WHIPPLE, OF DETROIT, MICHIGAN, ADMINISTRATRIX OF EFFINGER E. WHIPPLE, DECEASED.

AGRICULTURAL IMPLEMENT.

SPECIFICATION forming part of Letters Patent No. 636,878, dated November 14, 1899.

Application filed February 2, 1899. Serial No. 704,311. (No model.)

*To all whom it may concern:*

Be it known that EFFINGER E. WHIPPLE, deceased, late a citizen of the United States and resident of St. Johns, in the county of Clinton and State of Michigan, did invent certain new and useful Improvements in Agricultural Implements; and I, HANNAH M. WHIPPLE, administratrix of the estate of said EFFINGER E. WHIPPLE, deceased, as seen by certified copies of the letters of administration now on file in the Patent Office, do hereby declare the following to be a full, clear, and exact description of the invention, such as will enable others skilled in the art to which it appertains to make and use the same.

This invention relates to certain improvements in agricultural implements, and more particularly to that class generally termed "weeders;" and the objects and nature of the invention will appear from the description which follows when considered in the light of the example of a construction within the scope of this invention, as shown in the drawings.

The invention consists in certain novel features in construction and in arrangements of parts and in combinations, as more fully and particularly set forth and described hereinafter.

In the accompanying drawings, which merely illustrate one example among a number within the scope of this invention to enable those skilled in the art to readily understand the broad invention involved, Figure 1 is a side elevation. Fig. 2 is an end view. Fig. 3 is a top plan.

In the drawings, $a$ is any suitable draft or guiding frame, tongue, or shaft. The specific form shown in the drawings—however, this invention is not limited thereto—comprises a V-shaped strong rigid tongue the two long beams of which meet at the front to receive the neck-yoke, such as $a'$. The beams diverge rearwardly and extend transversely of the wide gang of cultivating or other soil-stirring devices. This gang is preferably made up of several beams $b\ b$, arranged a distance apart and usually, although not necessarily, parallel with each other. The beams of the tongue are shown extending transversely of and secured to the beams of the gang. Said beams $b\ b$ are also preferably secured together by cross plates or bars $b'$. The tongue is shown secured to the central portion of the gang, which extends laterally on both sides of the rear ends of the tongue. The gang is arranged transversely of the implement and is usually very wide—say from five to eight feet—and is provided with any suitable soil-stirring devices, such as long metal teeth of any desirable form. The gang is usually removably secured to the frame or tongue $a$, although normally rigid therewith. Various means can be provided to rigidly secure the gang to the frame.

In the drawings each beam $b$ is shown provided with an angle-piece $b^2$, secured thereto, with the perforated portion extending upwardly therefrom. The bars of the frame $a$ extend over and rest on the beams $b$ and are secured to said angles $b^2$ by removable bolts. Each beam $b$ preferably has an angle $b^2$ for each bar of the frame or tongue $a$. If desired, certain or all of the angles $b^2$ can be provided with vertical series of bolt-holes, so that the bolts can be shifted, and thereby adjust the gang with respect to the tongue to level the points of the cultivator-teeth. It is desirable to maintain the plane of the tooth-points approximately horizontal, so that all of the teeth work to approximately the same depth.

It should be noted that the gang can be removed from the supporting-frame intact. A number of gangs can be provided to fit and be attached to the same implement successively—that is, the gangs can be interchangeably used in the same implement. Thus a gang of weeder-teeth can be provided, also a gang of cultivating-teeth. Various gangs having different styles of teeth or soil-stirring devices can be used successively with the same wheeled attachment. Each gang is complete in itself and can be rigidly attached to or detached from the implement by merely inserting or removing the bolts passing through angles $b^2$ and the tongue. Each gang is provided with angles $b^2$ or other means to receive and be removably attached to the tongue.

If it is desirable to use the implement as a straddle-row cultivator, the beams $b$ can be provided with central removable sections $b^4$. This central removable section of the gang can be removable with its teeth, leaving a central blank space to straddle the row of plants, and suitable means, as a rigid arch $b^5$, can be employed to render the gang rigid. Dotted lines in Figs. 1 and 3 show such a removable arch which might be employed, although the invention is not limited thereto. However, it is not necessary to provide the removable sections, nor if they are used to employ the arch, as the beams are secured to the tongue on each side of the center of the gang.

Instead of having removable central sections the center teeth of the gang can be removed when the implement is to be used in cultivating rows of plants.

The tooth-bars $b$ are shown provided with suitable long soil stirring or cultivating teeth $b^6$. As the tooth-bars of the gang are usually maintained high above the ground—say about thirty inches—long metal teeth are usually employed. However, this invention is not limited to the employment of such teeth, as various kinds of soil-stirring teeth can be employed.

$c$ is the doubletree, provided with whiffletrees, and is located just in advance of the gang and can be coupled as found most desirable. It will thus be observed that in the specific construction shown in the drawings the draft-animals are arranged on opposite sides of the tongue $a$ and just in advance of the gang.

The implement is preferably provided with a riding or supporting attachment having an elevated support in a plane above the gang. In the example shown said attachment comprises an arched axle $d$, arranged immediately in rear of the gang, with small end-supporting wheels $d'$, arranged behind the teeth of the gang, as the axle is preferably shorter than the length of the gang. The axle preferably extends to a horizontal plane considerably above the horizontal plane of the top of the gang or of the tongue $a$ and has connecting or draft bars $d^2$ secured rigidly to the elevated portion thereof and extending forwardly and horizontally central of the implement to a point in advance of the gang. The draft-bars $d^2$ are preferably arranged a considerable distance above the gang and tongue $a$, or such a distance above the same as to permit the desired independent vertical movement of the gang. The said draft-bars are pivotally joined or connected to the tongue $a$ at a point a considerable distance in advance of the gang.

Usually the draft-bars of the wheeled attachment are connected to the tongue at a point about midway between the gang and the front end of the tongue, although the invention is not so limited. The draft-bars $d^2$ are usually secured to the axle a considerable distance apart and converge forwardly, and at their front ends are rigidly secured together and provided with a rigid forwardly-extending nose $d^3$, loosely coupled at its lower end to the tongue $a$ along the longitudinal central line of the machine or implement or along the central line of draft.

The wheeled attachment is usually provided with a rider's seat. In the specific construction shown a hammock-seat is disclosed. The draft-bars $d^2$ are extended rearwardly beyond the axle, and at the proper distance in rear of the axle a cross seat bar or support $d^4$ is at its ends secured to said bars $d^2$ and at a point centrally intermediate of or between said bars $d^2$ is provided with a seat $d^5$. The seat-support is preferably depressed between the draft-bars $d^2$, so that the seat is suspended usually below the plane of said bars. The ends of the draft-bars $d^2$ can be provided with series of vertical bolt-holes longitudinally of the bars, so that the seat-support can be moved toward or from the axle. The ends of the seat-bar can also be provided with series of bolt-holes to accommodate this adjustment.

The riding attachment is preferably so arranged with respect to the gang that the rider can, through the medium of his feet, in a measure control the movement of the gang and depress the same. This result can be attained by locating the seat so that the gang or some part thereof is within convenient reach of the rider. For instance, the gang or harrow frame is shown provided with rearwardly-extending bars $e$, rigidly secured to the tooth-beams $b$. These bars $e$ extend rearwardly a suitable distance to permit the rider to engage the same with his feet, and thereby swing the harrow laterally and guide the same and, if desirable, to throw his weight onto the same and force down the teeth. The side bars $e$ are shown provided with foot-rests $e'$ at their rear end.

The invention is not limited to an arched axle, nor to the peculiar draft connection or arrangement of seat.

Means are preferably provided whereby the working depth of the teeth can be controlled and whereby the tooth-gang can be elevated with the teeth clear of the soil for transportation. As a means which can be employed for this purpose an elevated part of the riding attachment can have a hand-lever or rocking means connected with the gang or a part secured thereto to lift the same. Hand-levers $f$ are shown mounted on the elevated axle. These levers are suitably connected with the tooth-gang. In the specific construction shown chains $f'$ are secured to the bars $e$ and at their upper ends confined to the hooks or noses rigid with and extending laterally from the levers. In such a construction the chains can be varied in length between the bars and the levers by catching different links on said hooked noses. However, of course this invention is not limited to such specific construction and manner of connecting the levers with the tooth-gang, nor to the levers, as one or more lifting means or stop mechanisms can be provided for the gang. The levers are provided with rigid toothed segments and pawls to engage therewith, having spring-actuated hand-clips whereby the levers can be locked in the desired adjustment and the tooth-gangs can be raised or lowered and held at the desired vertical position with respect to the wheeled attachment.

It should be noted that the point of connection or coupling between the gang and the wheeled attachment is a considerable distance in advance of both such parts and in advance of both the axle and gang and that this arrangement is an important feature of this invention among other features and combinations. This front coupling is usually so arranged as to allow the harrow frame or gang a free and independent lateral sway or swing. The rider from his seat can guide and push the gang independently of the wheeled attachment, in which case the gang swings from the chains or rear connections from the arched axle.

The riding attachment is preferably so arranged as to practically balance the implement and render it exceedingly easy to raise the gang. In fact, the weight of the rider constantly tends to lift the gang, through the medium of forwardly-extending tongue $d^2$, to an advanced portion of tongue $a$. By placing his weight partially on the gang the rider can relieve this tendency and cause the teeth to work their full capacity allowed by chains $f'$. The advanced coupling between the gang and riding attachment permits these various functions and allows the gang to be elevated, with its teeth, entirely clear of the ground and the weight thereof carried by the wheeled attachment and the draft-animals, or the weight of the rider might even then so balance the parts as to throw practically all of the weight onto the axle and wheels.

The forward coupling can be arranged to permit free lateral swing of the gang in following rows of plants; but the invention is not so limited.

It is obvious that many changes and modifications can be made without departing from the spirit and scope of this invention. Hence the invention is not limited to the constructions set forth herein.

What is claimed as new, and desired to be secured by Letters Patent of the United States, is—

1. An agricultural implement comprising a wide gang provided with a rigid forwardly-extending frame, in combination with a rear wheeled attachment having a long draft-tongue loosely coupled to said frame at an advanced point thereof.

2. An agricultural implement comprising a wide gang of teeth, in combination with a wheeled riding attachment, the wheeled support and said gang loosely coupled together at a point in advance of both, substantially as described.

3. An agricultural implement comprising a wide gang or frame provided with teeth, draft attachments, a wheeled support having a forwardly-extending frame coupled to said draft attachment at an advanced point ahead of the gang and wheeled support, substantially as described.

4. In combination, a gang or tooth frame having a forwardly-extending tongue, a wheeled axle having a rider's seat, and a connection extending forwardly above said gang and loosely joined at an advanced point to said tongue.

5. In combination, a wide gang or frame provided with teeth, and having a forwardly-extending frame, a wheeled support having a rider's seat in rear of the gang, and coupled to said frame at a point in advance of the gang.

6. A draft-tongue and a wheeled support, in combination with a wide gang of connected tooth-bars carrying teeth, and means for detachably securing said gang rigidly to said tongue, whereby different gangs with different teeth can be used interchangeably with the same tongue, substantially as described.

7. In combination, a transversely-arranged gang of teeth having a frame, a wheeled supporting attachment, the frame and attachment loosely coupled together at an advanced point, and elevated means carried by the attachment and connected to the gang to raise the same or limit the working depth of the teeth.

8. The weeder comprising the transversely-arranged connected tooth-bars having teeth secured thereto, and a draft connection secured to and extending forwardly from the central intermediate portions of the tooth-bars, in combination with a wheeled riding attachment extending forwardly and coupled loosely with said draft connection and at its rear having a rider's seat in rear of the tooth-bars, substantially as described.

9. In combination, a gang or tooth frame having a forwardly-extending connection, a riding attachment provided with a forward extension coupled to said connection and having a rider's seat at its rear, whereby the weight of the rider constantly tends to lift the connection and gang, substantially as described.

10. In combination, a gang or tooth frame having a forwardly-extending tongue rigid therewith, and a wheeled riding attachment coupled with said tongue and having a rider's seat in rear of the attachment and gang, whereby the weight of the rider tends to raise the tongue and gang and balance the gang, substantially as described.

11. A gang or tooth frame having a forwardly-extending tongue, in combination with a wheeled riding attachment having a draft connection extending forwardly above the gang and tongue and coupled to the tongue at an intermediate point in the length thereof, substantially as described.

12. A wide transversely-arranged gang or tooth frame having a forwardly-projecting draft connection, in combination with a wheeled riding or supporting attachment coupled to the draft connection between the front and rear ends thereof and having an elevated support, and a lifting or stop mechanism mounted on said elevated support and connected with the gang to limit the working depth of the teeth and to elevate the gang with its teeth clear of the soil, substantially as described.

13. A tooth gang or frame having an independent vertical movement, in combination with a wheeled riding attachment at its rear having two separated supports or beams the hammock-seat comprising the seat-bar extending between said beams and at its ends adjustably secured thereto and at its central depressed portion having the seat, substantially as described.

14. The gang or tooth frame having the forwardly-extending tongue, in combination with a wheeled riding attachment comprising an axle in rear of the gang with a forwardly-extending draft connection loosely coupled to said tongue in advance of the gang and provided with a rider's seat in rear of the axle, whereby the rider can direct and push the gang with his feet, substantially as described.

15. A gang or tooth frame having a rearward projection rigid therewith and a forwardly-extending draft connection, in combination with a wheeled riding attachment loosely coupled to said draft connection, the seat arranged adjacent to said projection the attachment provided with a lifting-lever connecting with said projection, substantially as described.

16. The gang-frame comprising the transversely-arranged parallel rigidly-connected tooth-bars having depending teeth, and a rigid tongue secured to and extending forwardly from the central portion of the gang-frame, in combination with a wheeled axle in rear of the central portion of the gang and provided with a rider's seat and a connection extending forwardly and coupled to said tongue, and supporting mechanism carried by said axle whereby the tooth-gang can be held elevated with its teeth clear of the soil, substantially as described.

17. A transversely-arranged tooth-gang having a forward extension rigid therewith, in combination with a wheeled riding attachment having a rigid forward extension coupled loosely with said gang and a rider's seat in a vertical plane in rear of the supporting-wheels, whereby the weight of the rider tends to balance the weight of the gang, substantially as described.

18. A wide tooth-gang in combination with a wheeled axle having a forward connection coupled with the gang and a rider's seat in rear of the axle, whereby the weight of the rider tends to lift the gang, substantially as described.

19. A wide transversely-arranged tooth-gang having a forward draft connection, in combination with a rear axle having forward draft connection coupled to said gang-draft connection between the front and rear ends thereof, and a lifting-lever carried by said axle and connected with the gang to lift the same whereby the weight thereof is carried by its draft connection and said wheeled axle, substantially as described.

20. A weeder-gang provided with a draft-tongue and having a rear wheeled riding attachment coupled to the draft-tongue of the weeder between its front end and the tooth-gang, substantially as described.

In testimony whereof I affix my signature in presence of two witnesses.

HANNAH M. WHIPPLE,
*Administratrix of the estate of Effinger E. Whipple, deceased.*

Witnesses:
  META ASHLEY,
  MARY MAUD WHIPPLE.